United States Patent [19]

Koide et al.

[11] Patent Number: 5,474,733
[45] Date of Patent: Dec. 12, 1995

[54] SCREW DRIVING METHOD FOR INJECTION MOLDING MACHINE

[75] Inventors: Atushi Koide; Koichi Matsubayashi; Junichi Shimizu, all of Nagano, Japan

[73] Assignee: Nissei Plastic Industrial Co., Ltd., Nagano, Japan

[21] Appl. No.: 236,153

[22] Filed: May 2, 1994

Related U.S. Application Data

[63] Continuation of Ser. No. 999,358, Dec. 31, 1992, abandoned.

[30] Foreign Application Priority Data

Jan. 17, 1992 [JP] Japan ..................................... 4-027215

[51] Int. Cl.⁶ ............................. B29C 45/82; B29C 45/50
[52] U.S. Cl. ..................... 264/328.1; 264/328.8; 264/328.13; 425/145; 425/587
[58] Field of Search .............................. 264/40.1, 328.1, 264/328.8, 238.13, 40.5; 425/145, 542, 587

[56] References Cited

U.S. PATENT DOCUMENTS

| | | | |
|---|---|---|---|
| 3,080,610 | 3/1963 | Baigent | 425/587 |
| 3,259,943 | 7/1966 | Kovach et al. | 425/587 |
| 3,806,294 | 4/1974 | Hehl | 425/145 |
| 4,579,515 | 4/1986 | Kawaguchi et al. | 425/145 |
| 4,712,991 | 12/1987 | Hehl | 425/149 |
| 4,879,077 | 11/1989 | Shimizu et al. | 425/145 |
| 5,002,717 | 3/1991 | Taniguchi | 425/587 |
| 5,221,509 | 6/1993 | Fujimoto et al. | 425/145 |

FOREIGN PATENT DOCUMENTS

| | | | |
|---|---|---|---|
| 2425459 | 1/1975 | Germany | 425/145 |
| 59-15295 | 4/1984 | Japan . | |
| 61-237614 | 10/1986 | Japan | 425/145 |
| 2146017 | 12/1990 | Japan . | |
| 1097546 | 1/1968 | United Kingdom | 425/145 |

*Primary Examiner*—Jill L. Heitbrink
*Attorney, Agent, or Firm*—Birch, Stewart, Kolasch & Birch

[57] ABSTRACT

A screw driving mechanism E which uses a hydraulic cylinder (main cylinder) 2 arranged on the same axis with respect to a screw 3 so as to allow the screw 3 to perform frontward and rearward driving. A pair of auxiliary cylinders 4 and 5 are arranged in parallel at both sides of the main cylinder 2, and the forward ends of piston portions 4p and 5p of the auxiliary cylinders 4 and 5 are joined to the forward end of a piston portion 2p of the main cylinder 2 via a joint mechanism 6. This makes it possible to select a plurality of different injection pressures.

4 Claims, 5 Drawing Sheets

FIG.5

|  | V1 | | V2 | | V3 | |
|---|---|---|---|---|---|---|
|  | a | b | a | b | a | b |
| F1=Fb−Fc |  |  | ○ |  | ○ |  |
| F2=Fb |  |  | ○ |  |  | ○ |
| F3=Fa−Fc | ○ |  |  | ○ | ○ |  |
| F4=Fa | ○ |  |  | ○ |  | ○ |
| F5=Fa+Fb−Fc | ○ |  | ○ |  | ○ |  |
| F6=Fa+Fb | ○ |  | ○ |  |  | ○ |

5,474,733

SCREW DRIVING METHOD FOR INJECTION MOLDING MACHINE

This application is a continuation of application Ser. No. 07/999,358 filed on Dec. 31, 1992, now abandoned.

FIELD OF THE INVENTION

This invention relates to a method for driving a screw of an injection molding machine provided with a screw driving mechanism for allowing the screw to perform frontward and rearward driving using hydraulic cylinders of the multiple stage type.

DESCRIPTION OF THE RELEVANT ART

Generally, an injection molding machine 60 of the hydraulic type, which is provided with a hydraulic cylinder 61 for allowing a screw to perform frontward and rearward driving as shown in FIG. 6, is known. The injection molding machine 60 is provided with a screw 62, in which the forward end side of the screw 62 is inserted into the interior of a heating cylinder 63, and the backward end of the screw 62 is jointed to the forward end of a piston portion 64 of a hydraulic cylinder 61. In addition, an oil motor 65 for rotational driving of the screw is provided at the backward end of the hydraulic cylinder 61, and an output shaft of the same oil motor 65 is inserted via a spline mechanism 66 into the interior from the backward end of the piston portion 64. Thus, when the operation control of the hydraulic cylinder 61 is made, it is possible to perform the frontward and rearward movement control of the screw 62, and when the operation control of the oil motor 65 is made, it is possible to perform the rotational control of the screw 62.

By the way, in such an injection molding machine, when molding conditions such as an injection speed, an injection pressure and the like are set, the most suitable values in accordance with a size and a shape of a molding article are set, however, their setting ranges depend on a capacity of the screw driving mechanism, so that there is such a weak point that the setting ranges are limited in the case of a single hydraulic cylinder.

Thus, in the prior art, as disclosed in the official gazette of Japanese Utility Model Laid-open No. 146017-1990 and the official gazette of Japanese Patent Publication No. 15295-1984, a hydraulic cylinder of the multiple stage type with which a plurality of outputs having different magnitude can be taken out is used, thereby it has been contemplated to enlarge the setting ranges during the setting of molding conditions. Incidentally, in the former injection molding machine, single hydraulic cylinders to form pairs, which are arranged in parallel at positions symmetric with respect to the shaft center of a screw, are joined to the screw as a plurality of pairs, and in the latter injection molding machine, several types of rams having different diameter sizes in a step by step manner are continued in the order of the magnitude of the diameter sizes, action chambers constituted by the rams and cylinders are formed in cylindrical shapes, an inflow tube for oil is connected to each of the action chambers respectively to introduce into a direction control valve, and oil is introduced with pressure into each of the action chambers simultaneously, or with a given time difference for each action chamber, so as to operate the hydraulic cylinders.

However, in any one of such conventional injection molding machines, the whole structure of the injection molding apparatus including the hydraulic cylinders is greatly different as compared with the case of the single hydraulic cylinder. The existing injection molding machine provided with the single hydraulic cylinder cannot be utilized as such, and a problem of a considerable increase in cost results.

In addition, in any one of the injection molding machines, the hydraulic cylinder itself for directly driving the screw is subjected to enlargement in diameter or increase in quantity, so that a problem results of the whole injection molding apparatus having a large scale.

SUMMARY OF THE INVENTION

It is an object of this invention to provide an injection molding machine which can be easily constituted into a multiple stage type by directly utilizing an existing injection molding machine provided with a single hydraulic cylinder.

In addition, it is another object of this invention to provide an injection molding machine in which a great decrease in cost and realization of a small and compact size can be contemplated, and additionally availability for general purpose can be enhanced.

In order to achieve the above-mentioned objects, this invention lies in the constitution of an injection molding machine 1 provided with a screw driving mechanism E which uses a hydraulic cylinder (main cylinder) 2 arranged on the same axis with respect to a screw 3 so as to allow the screw 3 to perform frontward and rearward driving, characterized in that especially a pair of auxiliary cylinders 4 and 5 are arranged in parallel at both sides of the main cylinder 2, and the forward ends of piston portions 4p and 5p of the auxiliary cylinders 4 and 5 are joined to the forward end of a piston portion 2p of the main cylinder 2 via a joint mechanism 6.

In this case, the joint mechanism 6 is provided with a joint block 7, the piston portions 4p and 5p of the auxiliary cylinders 4 and 5 are joined to both sides of the joint block 7, a fixing block 18 is supported at the center of the joint block 7 in a manner freely capable of rotational movement, and the fixing block 18 is joined to the piston portion 2p of the main cylinder 2 and the backward end of the screw 3. In addition, the construction is made such that at least pressure-receiving areas Sa [$cm^2$], Sb [$cm^2$] and Sc [$cm^2$] of a rear oil chamber of the main cylinder 2 (main rear oil chamber) Ca, a rear oil chamber of the auxiliary cylinder 4 . . . (auxiliary rear oil chamber) Cb . . . and a front oil chamber of the auxiliary cylinder 4 . . . (auxiliary front oil chamber) Cc . . . are made different with each other, and a hydraulic circuit 8 is provided which is capable of supplying pressurized oil by selecting at least one or two or more of the main rear oil chamber Ca, the auxiliary rear oil chamber Cb . . . and the auxiliary front oil chamber Cc . . . .

Owing to such constitution, when the pressurized oil is supplied only to the main rear oil chamber Ca of the main cylinder 2, the screw 3 performs frontward movement, and the magnitude of an output Fa [kg] with respect to the screw 3 at this time is a product (Sa×Po) of the pressure-receiving area Sa [$cm^2$] of thee main rear oil chamber Ca and the oil pressure Po [$kg/cm^2$] Of the hydraulic circuit 8.

In addition, when the pressurized oil is supplied only to the auxiliary rear oil chamber Cb . . . of the auxiliary cylinder 4 . . . , the screw 3 performs frontward movement, and the magnitude of an output Fb with respect to the screw 3 at this time is a product (Sb×Po) of the pressure-receiving area Sb of the auxiliary rear oil chamber Cb . . . and the oil pressure Po.

On the other hand, when the pressurized oil is supplied only to the auxiliary front oil chamber Cc . . . of the auxiliary cylinder 4 . . . , the pressure is applied in a direction for allowing the screw 3 to perform rearward movement, and the magnitude of an output Fc with respect to the screw 3 is a product (Sc×Po) of the pressure-receiving area Sc of the auxiliary front oil chamber Cc . . . and the oil pressure Po, which acts in the negative direction.

Therefore, the magnitude of the pressure-receiving area Sa, the pressure-receiving area Sb and the pressure-receiving area Sc is constituted to give a relation of Sa>Sb>Sc, and the hydraulic circuit 8 is controlled, thereby when the pressurized oil is supplied by selecting one or two or more ones of the main rear oil chamber Ca, the auxiliary rear oil chamber Cb . . . and the auxiliary front oil chamber Cc . . . , then it is possible to select six types of magnitude of F1=Fb–Fc, F2=Fb, F3=Fa–Fc, F4=Fa, F5=Fa+Fb–Fc and F6=Fa+Fb. In other words, six different types of injection pressures as the Output with respect to the screw 3 can be selected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 shows a control matrix for each switching valve with respect to the output.

DETAILED DESCRIPTION OF THE PREFERRED EMBODIMENTS

Figure 1:
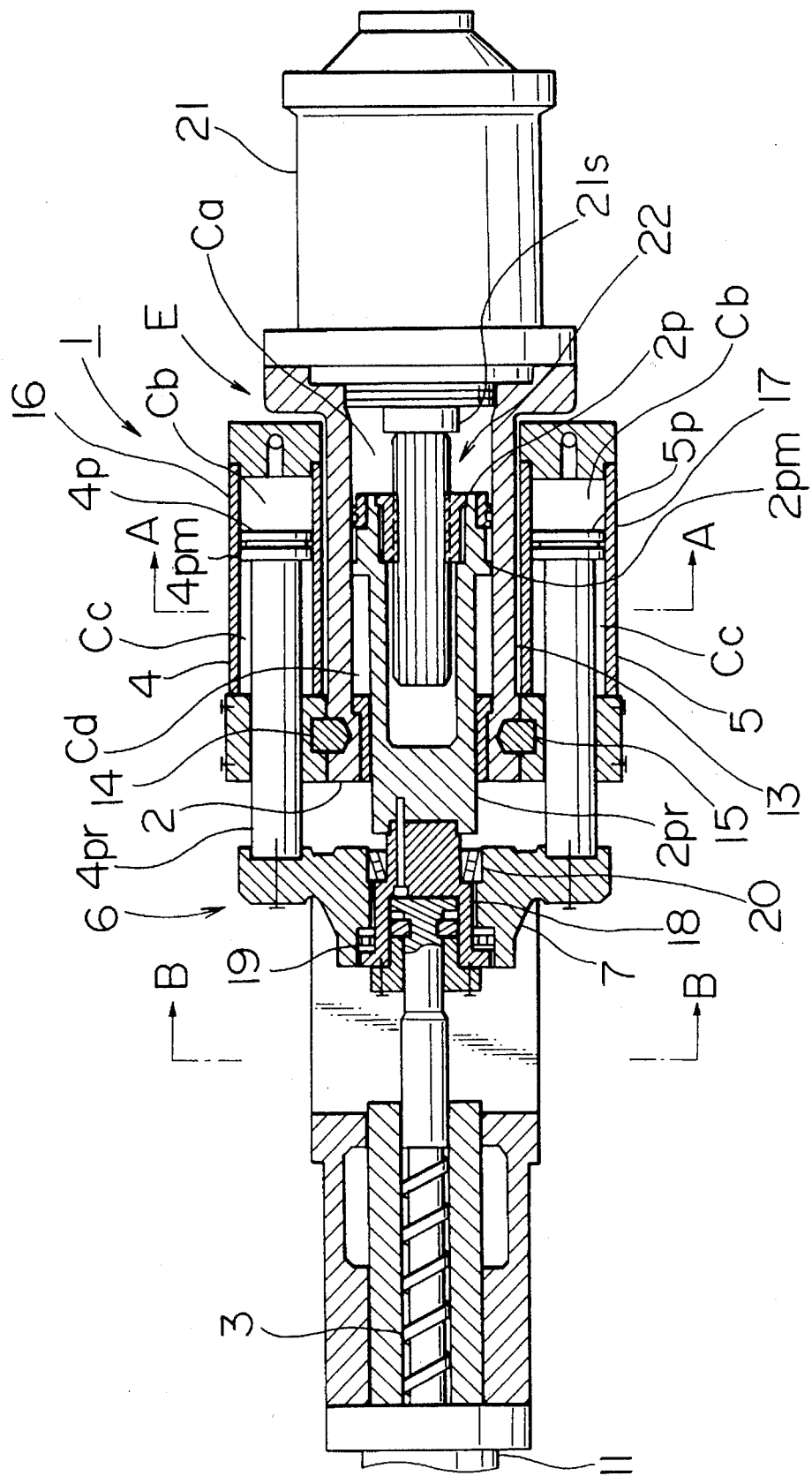
FIG. 1 is a partial view of constitution including. partial cross-section of an injection molding machine according to this invention.
Figure 2:
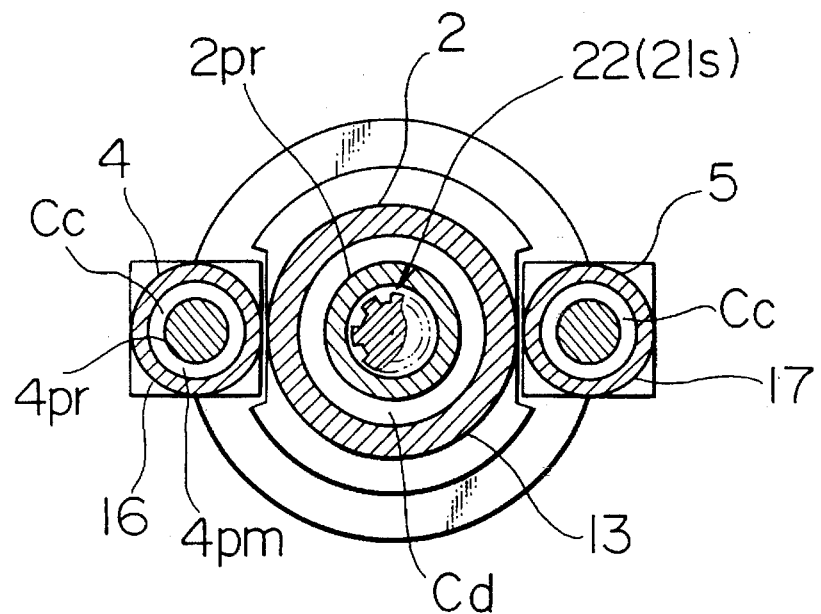
FIG. 2 is a cross-sectional view taken along the line A—A in FIG. 1.
Figure 3:
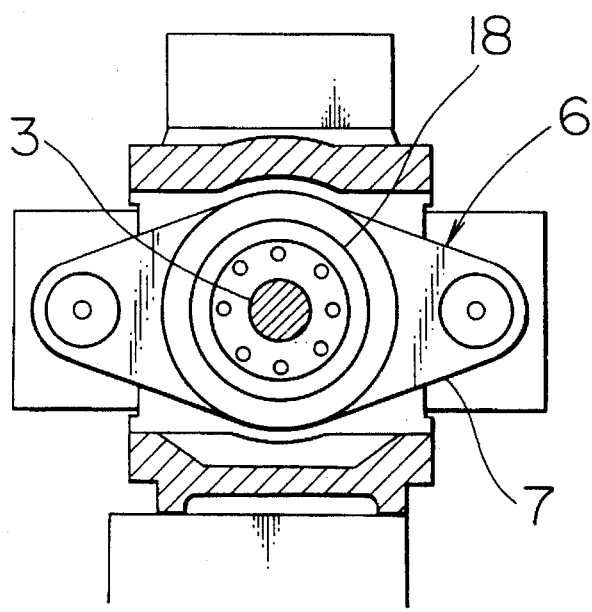
FIG. 3 is a cross-sectional view taken along the line B—B in FIG. 1.

Next, the most suitable example of this invention will be referred to, which will be explained in detail on the basis of the drawings.

At first, the constitution of an injection molding machine according to this invention will be explained with reference to FIG. 1 to FIG. 4.

In the figures, the reference numeral 1 is the injection molding machine, especially showing a part of the injection apparatus. A screw 3 has a forward end side of which is inserted into the interior of a heating cylinder 11, and the backward end of the screw 3 is joined to the side of a screw driving mechanism E.

The screw driving mechanism E is provided with a main cylinder (hydraulic cylinder for performing frontward and rearward driving of the screw) 2. The main cylinder 2 contains a piston portion 2p of the single rod type at a cylinder portion 13, and a piston rod 2pr of this piston portion 2p protrudes frontwardly from the forward end of the cylinder portion 13. The rear portion of a piston main body 2pm at the cylinder portion 13 serves as a main rear oil chamber Ca, and the front portion of the piston main body 2pm serves as a main front oil chamber Cd.

In addition, a pair of auxiliary cylinders (hydraulic cylinders) 4 and 5 are arranged in parallel at both right and left sides of the main cylinder 2 via joining members 14 and 15. The auxiliary cylinder 4 (one at the side of 5 is the same) contains a piston portion 4p of the single rod type at a cylinder portion 16, and a piston rod 4pr of this piston portion 4p protrudes frontwardly from the forward end of the cylinder portion 16, and the rear portion of a piston main body 4pm at the cylinder portion 16 serves as an auxiliary rear oil chamber Cb, and the front portion of the piston main body 4pm serves as an auxiliary front oil chamber Cc. Incidentally, with respect to the auxiliary cylinder 5 at the other side, 17 is a cylinder portion, and 5p indicates a piston portion.

On the other hand, the piston portion 2p (piston rod 2pr) of the main cylinder 2 is attached with a screw fixing block 18 at the forward end and the backward end of the screw 3 is inserted into and fixed to a concave portion formed at the forward end of this fixing block 18. In addition, the fixing block 18 and the forward ends of the piston portions 4p and 5p of the auxiliary cylinders 4 and 5 are joined via a joint mechanism 6. Namely, the outer peripheral surface of the fixing block 18 is attached to the center of a joint block 7 via a pair of front and rear bearings 19 and 20 in a manner freely capable of rotational movement, and the forward ends of the piston portions 4p and 5p are fixed to both sides of this joint block 7. By doing so, the piston portion 2 is supported by the joint block 7 in a manner freely capable of rotational movement, and the piston portion 2p and the piston portions 4p and 5p integrally perform displacement in forward and backward directions (frontward and rearward directions) via the joint block 7. Incidentally, in this case, as the bearing 19 at the forward side, a thrust bearing which endures the injection pressure of the auxiliary cylinders 4 and 5 is utilized.

On the other hand, an oil motor 21 for rotational driving of the screw is attached to the backward end of the main cylinder 2. A rotation shaft 21s of the oil motor 21 extends frontwardly, and is inserted into the interior from the backward end of the piston portion 2p via a spline mechanism 22.

Incidentally, the magnitude of a pressure-receiving area Sa of the main rear oil chamber Ca, a pressure-receiving area Sb of the auxiliary rear oil chamber Cb . . . and a pressure-receiving area SO of the auxiliary front oil chamber Cc . . . is selected to give a relation of Sa>Sb>Sc. In this case, the pressure-receiving area Sb and the pressure-receiving area Sc are the magnitude obtained by adding those at both of the side of 4 and the side of 5 of the pair of the auxiliary cylinders, respectively.

Figure 4:
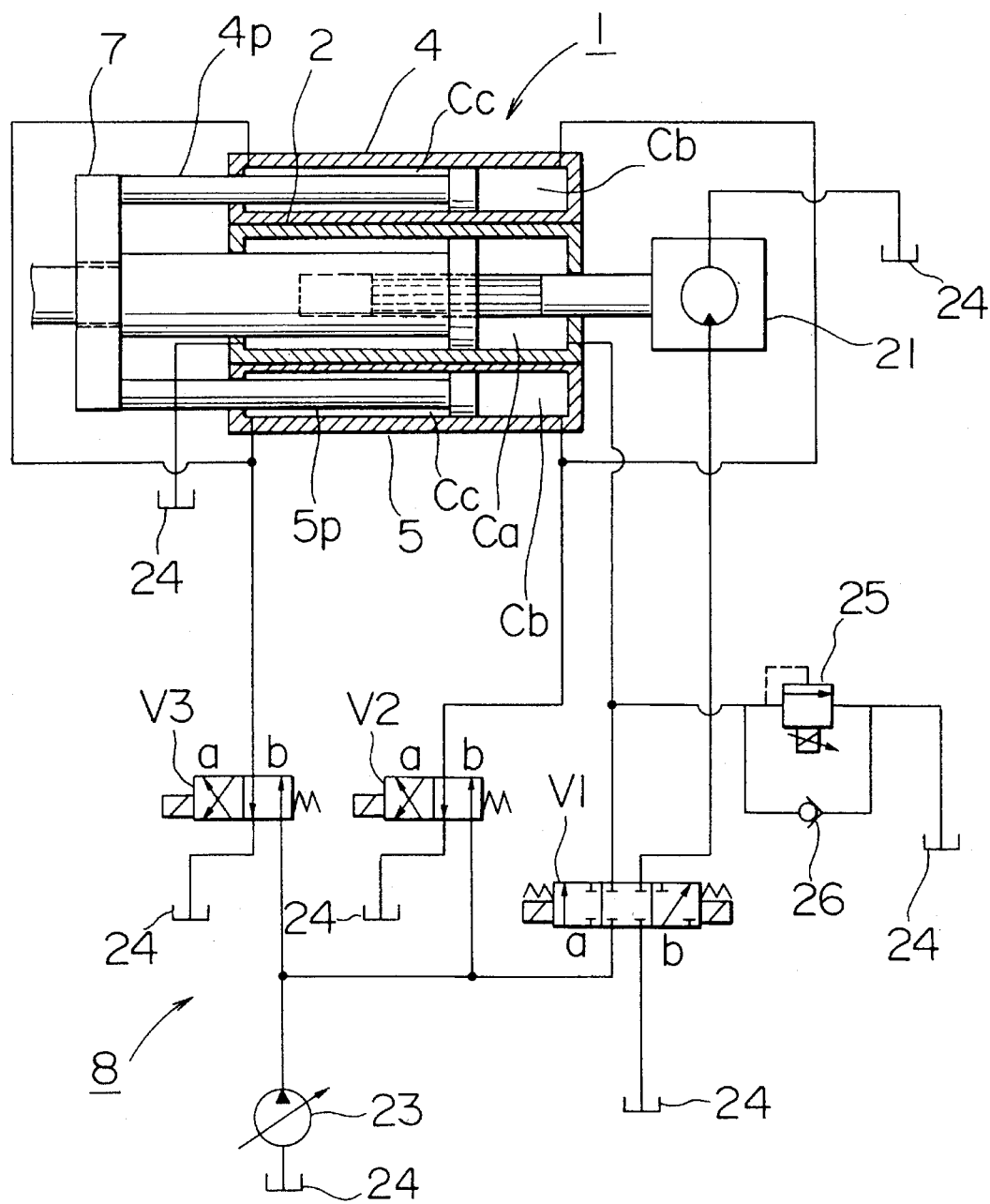
FIG. 4 shows a hydraulic circuit of the injection molding machine according to this invention.

In addition, as shown in FIG. 4, the main rear oil chamber Ca and the main front oil chamber Cd . . . of the main cylinder 2, the auxiliary rear oil chamber Cb . . . and the auxiliary front oil chamber Cc . . . of the auxiliary cylinders 4 and 5, and the oil motor 21 are connected to a hydraulic circuit 8. The hydraulic circuit 8 is provided with a hydraulic pump 23, oil tanks 24, a four port switching valve V1, three port switching valves V2 and V3, a relief valve 25 and a check valve 26 which are connected as shown in FIG. 4.

Next, the operation as a whole of the injection molding machine 1 according to this invention will be explained.

With respect to the injection molding machine 1, when the operation control of the main cylinder 2 and the auxiliary cylinders 4 and 5 is made, the frontward and rearward movement control of the screw 3 can be performed, and when the operation control of the oil motor 21 is made, the rotational control of the screw 3 can be performed.

On the other hand, during the frontward and rearward movement control of the screw 3, using the hydraulic circuit 8, when the pressurized oil is supplied by selecting one or two or more of each of the oil chambers Ca, Cb and Cc, it is possible to select six types of magnitude of F1=Fb−Fc, F2=Fb, F3=Fa−Fc, F4=Fa, F5=Fa+Fb−Fc and F6=Fa+Fb as the output with respect to the screw 3. In this case, the output Fa is a product (Sa×Po) of the pressure-receiving area Sa of the main rear oil chamber Ca and the oil pressure Po of the hydraulic circuit 8, the output Fb is a product (Sb×Po) of the pressure-receiving area Sb of the auxiliary rear oil chamber Cb . . . and the oil pressure Po, the output Fc is a product (Sc×Po) of the pressure-receiving area Sc of the auxiliary front oil chamber Cc . . . and the oil pressure Po, and Fc acts in the negative direction.

FIG. 5 is a control matrix for each of the switching valves V1, V2 and V3 to be subjected to switching control during the selection of each of the outputs F1 to F6, in which the mark "o" means that switching is performed to the symbol "a" side or the symbol "b" side corresponding in FIG. 4, and those in which both have no mark mean the neutral position. As one example, when the output F6 is selected, switching is performed to the symbol "a" side for the switching valve V1, to the symbol "a" side for the switching valve V2 and to the symbol "b" side for the switching valve V3, respectively. Also in other output modes, each of the switching valves V1, V2 and V3 are subjected to switching control in the same manner in accordance with the control matrix shown in FIG. 5.

Figure 6:
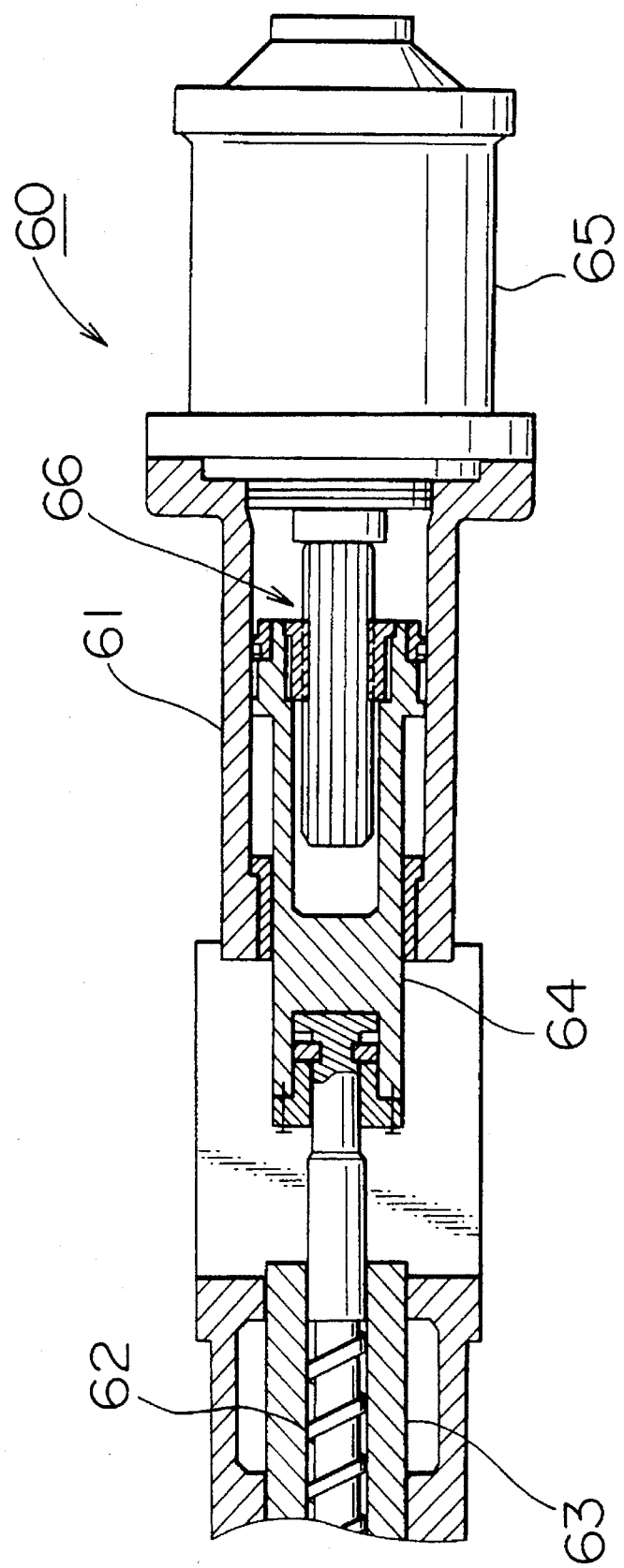
FIG. 6 is a partial view of a partial cross-section of an injection molding machine in accordance with the prior art.

As described above, as compared with the conventional injection molding machine 60 shown in FIG. 6, the injection molding machine 1 according to this invention can constitute the injection molding machine of the multiple stage type by the addition of the auxiliary cylinders 4 and 5 and the joint mechanism 6 without changing the basic structure but with minor alteration, which can be carried out at a low cost. In addition, since the three cylinders are reasonably provided together in the horizontal direction, an advantage occurs that the dead space can be excluded to make it possible to contemplate a small and compact scale.

As described above, the explanation has been made in detail with respect to the example, however, this invention is not limited to such an example. For example, the screw in this invention is a concept which includes various injection members such as a plunger and the like capable of injecting a resin. Other than the above, optional alteration and working can be performed with respect to the constitution, shape and the like of details within a range without deviating from the spirit of this invention.

We claim:

1. A screw driving method for an injection molding machine, comprising the steps of:

providing a main cylinder and a pair of auxiliary cylinders arranged generally parallel to both sides of the main cylinder for the injection molding machine, the main cylinder being arranged on an identical axis with respect to the screw, a piston portion of the main cylinder and piston portions of the auxiliary cylinders being protrudable frontward and a leading edge of each of the pistons being coupled through a joint mechanism, the main cylinder having a rear oil chamber and each of the auxiliary cylinders having a front oil chamber and a rear oil chamber;

selecting a relationship of each area to receive pressure in the rear oil chamber of the main cylinder, in the rear oil chambers of the auxiliary cylinders and in the front oil chambers of the auxiliary cylinders so that the area to receive pressure in the main rear oil chamber is greater than the area in the auxiliary front oil chambers;

selectively supplying hydraulic oil to at least one of the main rear oil chamber, auxiliary rear oil chambers and auxiliary front oil chambers, the hydraulic oil being simultaneously supplied when more than one of the main rear oil chamber, auxiliary rear oil chambers and auxiliary front oil chambers are supplied with hydraulic oil; and advancing the screws upon the selective supply of the at least one chamber except for supply of hydraulic oil only to the auxiliary front oil chambers alone, wherein during the step of selectively supplying hydraulic oil one of the oil chambers or a plurality of the oil chambers are selectable to receive hydraulic oil, and wherein the step of selectively supplying hydraulic oil comprises the step of providing six outputs of hydraulic oil for advancing the screw, the outputs being selected from one of the following steps:

simultaneously supplying hydraulic oil to the auxiliary front oil chambers and to the auxiliary rear oil chambers;

simultaneously supplying hydraulic oil to the auxiliary rear oil chambers;

simultaneously supplying hydraulic oil to the main rear oil chamber and the auxiliary front oil chambers;

simultaneously supplying hydraulic oil to the main rear oil chamber;

simultaneously supplying hydraulic oil to the main rear oil chamber, the auxiliary front oil chambers and the auxiliary rear oil chambers; and simultaneously supplying hydraulic oil to the main rear oil chamber and the auxiliary rear oil chambers.

2. The screw driving method for an injection molding machine according to claim 1, wherein the step of selecting a relationship of each area to receive pressure comprises selecting an area for the auxiliary rear oil chambers is between the area selected for the main rear oil chamber and the auxiliary front oil chambers, the area selected for the main rear oil chamber being larger than the area selected for the auxiliary front oil chambers.

3. The screw driving method for an injection molding machine according to claim 1, wherein the step of selecting a relationship of each area to receive pressure comprises selecting areas for the main rear oil chamber, the auxiliary rear oil chambers and the auxiliary front oil chambers which are different.

4. The screw driving method for an injection molding machine according to claim 1, wherein the step of providing includes the step of positioning the pair of auxiliary cylinders adjacent to and beside the main cylinder.

* * * * *